Figure 1:
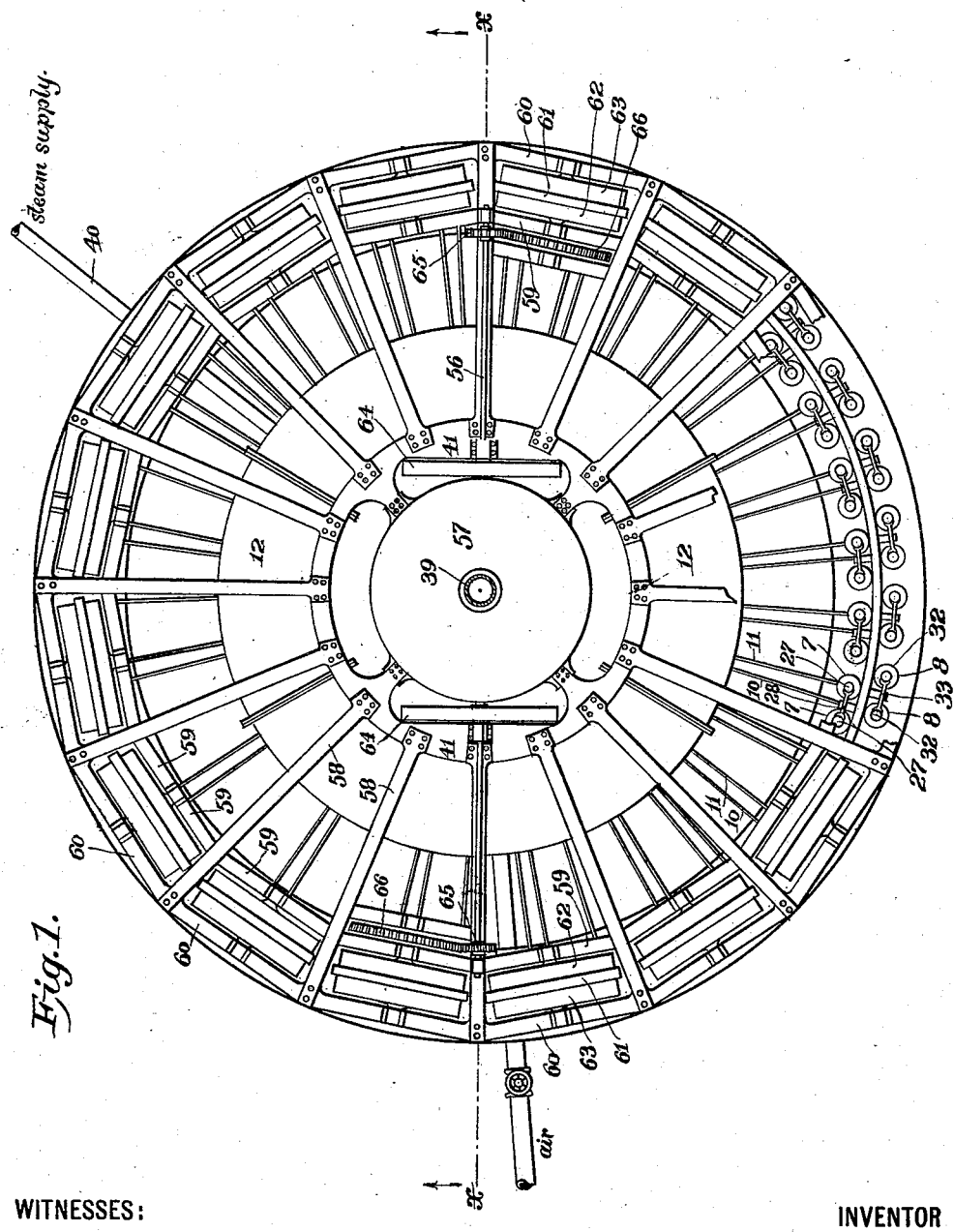

(No Model.) 5 Sheets—Sheet 1.

E. CHAQUETTE.
APPARATUS FOR COMPRESSING AIR.

No. 548,800. Patented Oct. 29, 1895.

WITNESSES:

INVENTOR
E. Chaquette
BY
ATTORNEY (No Model.) 5 Sheets—Sheet 2.
E. CHAQUETTE.
APPARATUS FOR COMPRESSING AIR.
No. 548,800. Patented Oct. 29, 1895.
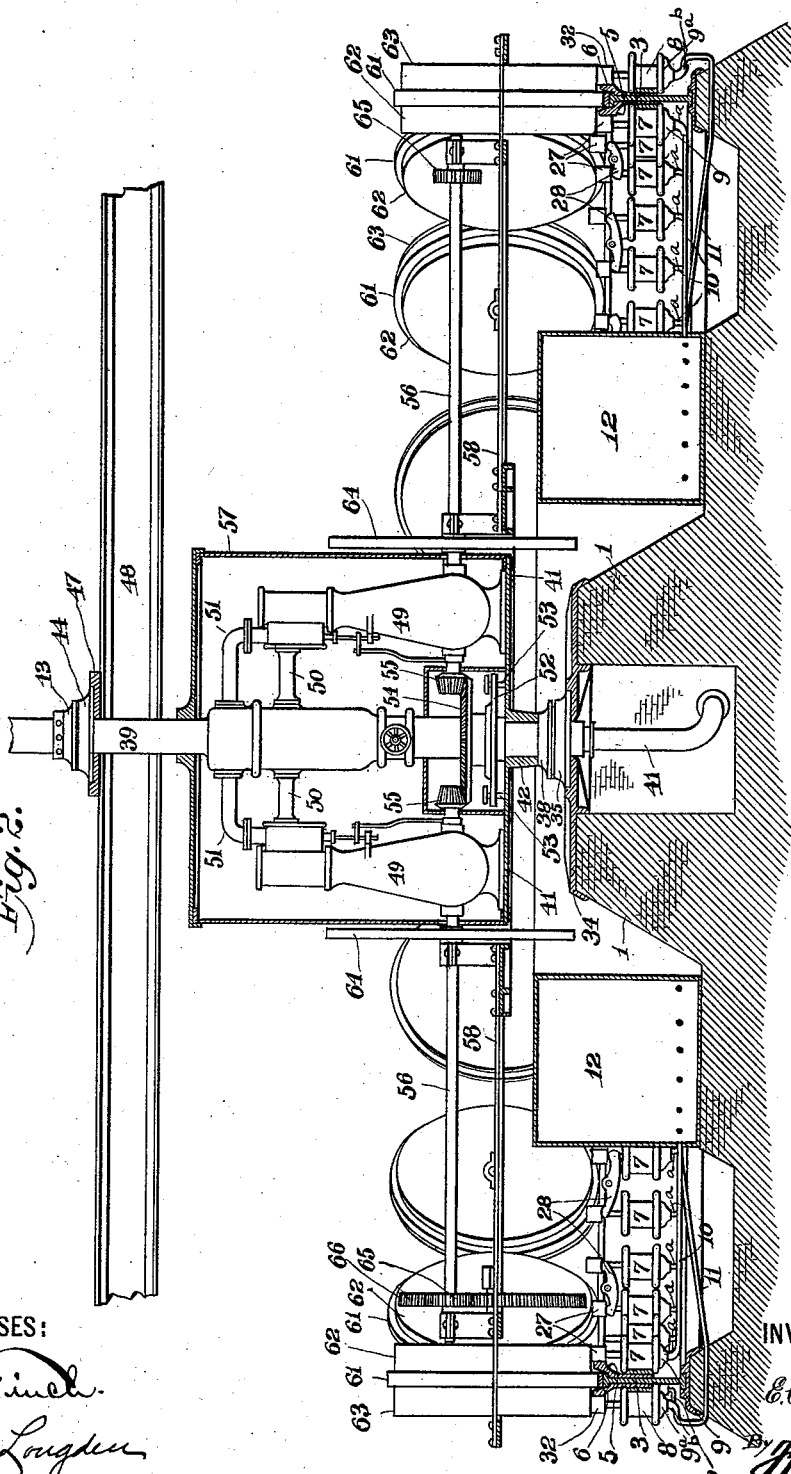
WITNESSES:
J. F. Finch.
M. T. Longden
INVENTOR
E. Chaquette
By J. M. Smith Jr.
ATTORNEY

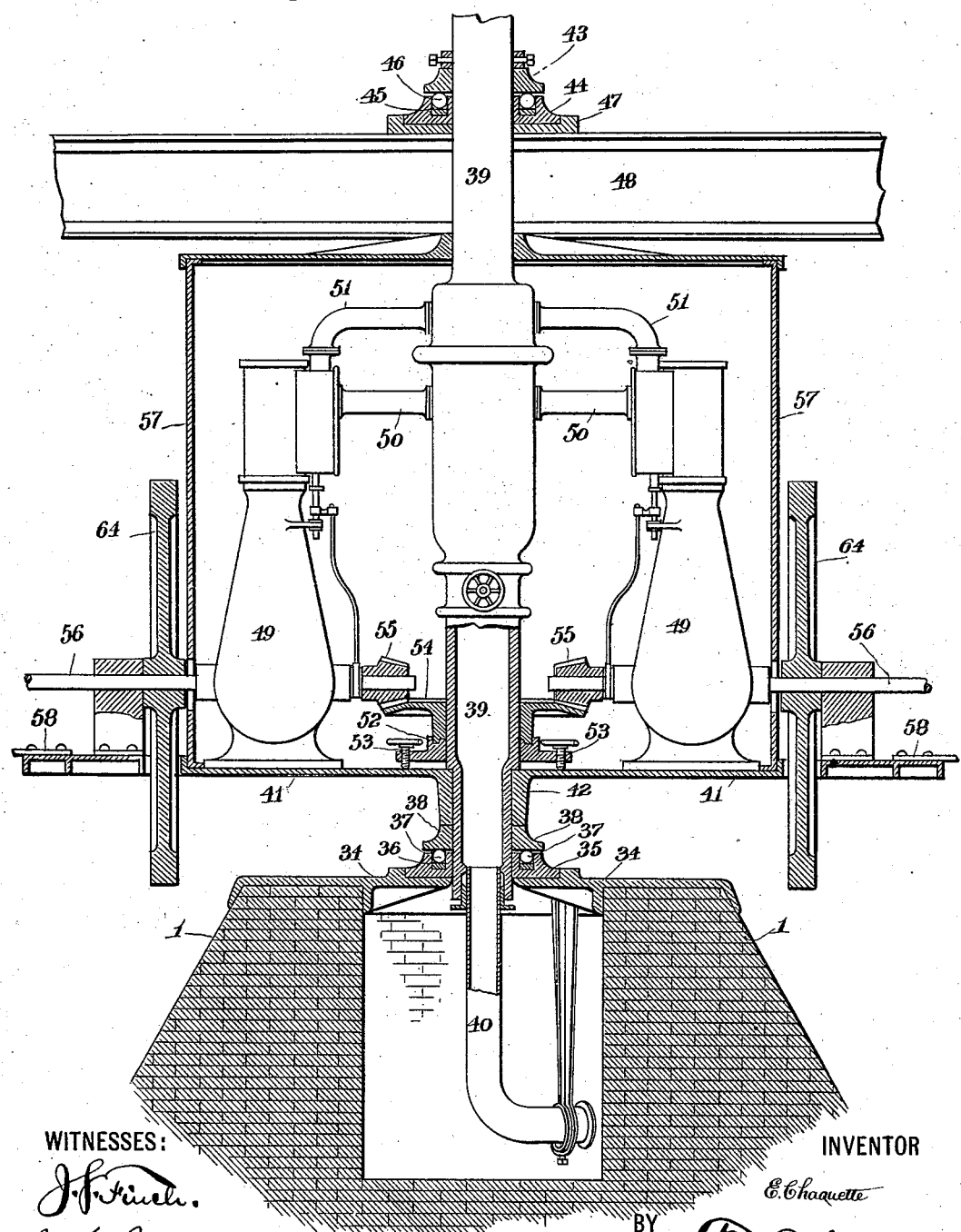

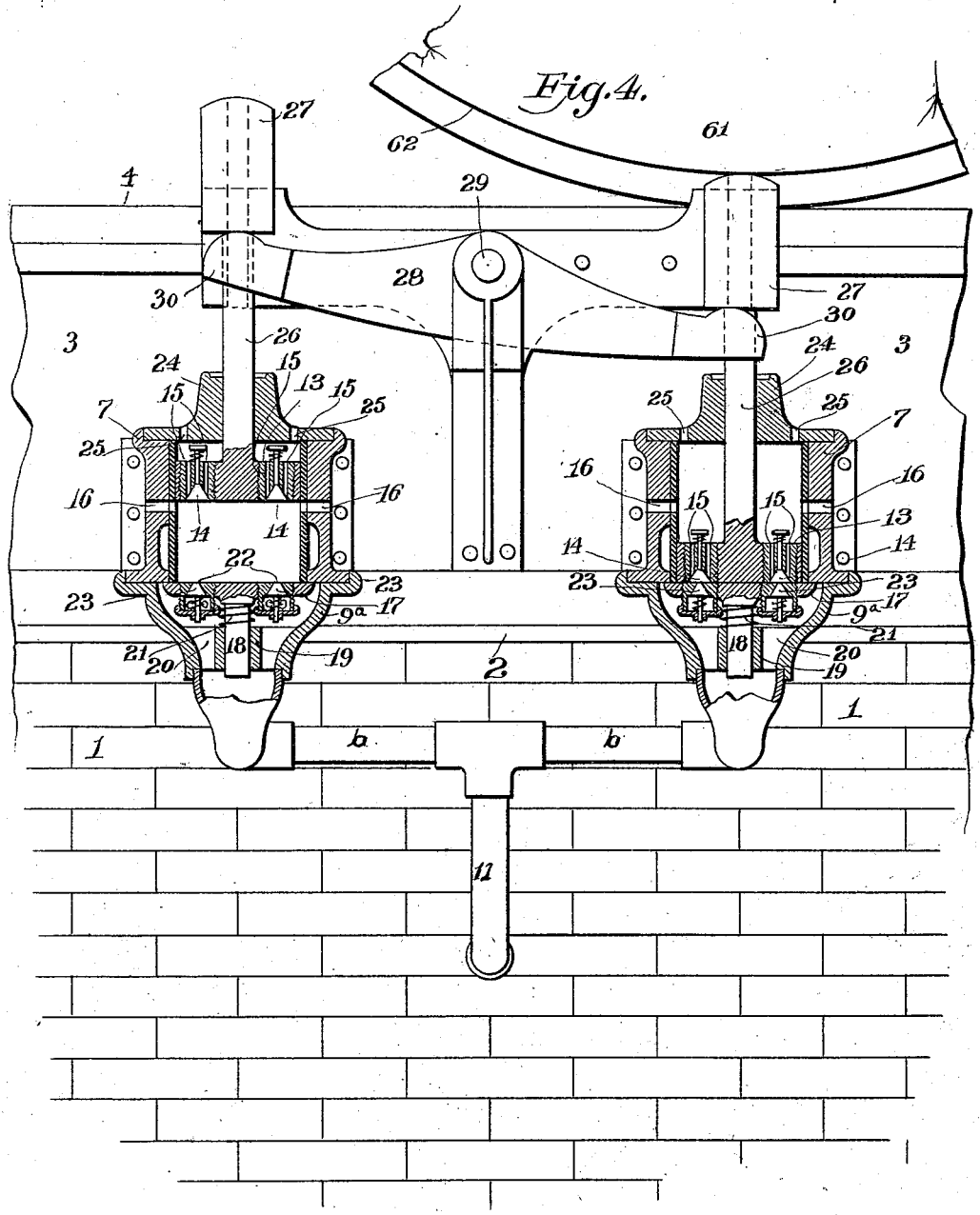

(No Model.) 5 Sheets—Sheet 5.
E. CHAQUETTE.
APPARATUS FOR COMPRESSING AIR.
No. 548,800. Patented Oct. 29, 1895.
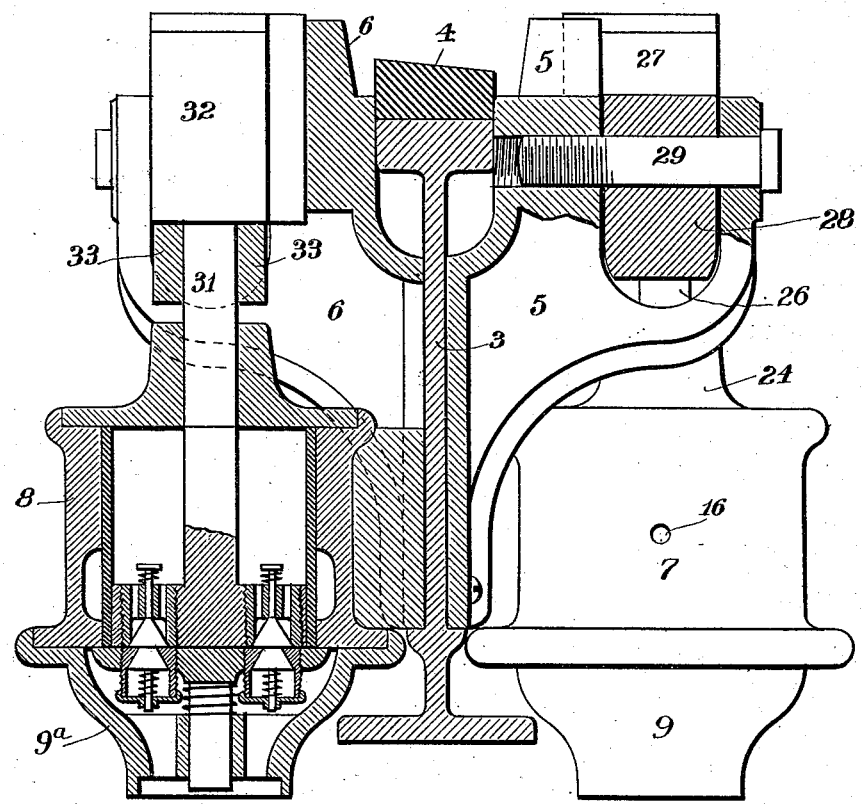
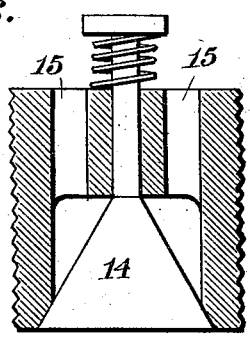
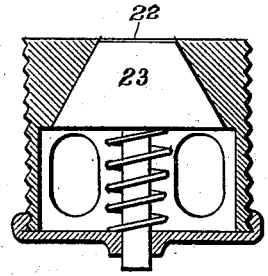
WITNESSES:
J. F. Finch.
M. T. Longden
INVENTOR
E. Chaquette
BY
J. W. Smith Jr.
ATTORNEY

UNITED STATES PATENT OFFICE.

EPHRAIEM CHAQUETTE, OF BRIDGEPORT, CONNECTICUT, ASSIGNOR TO THE CHAQUETTE POWER COMPANY, OF SAME PLACE.

APPARATUS FOR COMPRESSING AIR.

SPECIFICATION forming part of Letters Patent No. 548,800, dated October 29, 1895.

Application filed December 14, 1894. Serial No. 531,821. (No model.)

*To all whom it may concern:*

Be it known that I, EPHRAIEM CHAQUETTE, a citizen of the United States, residing at Bridgeport, in the county of Fairfield and State of Connecticut, have invented certain new and useful Improvements in Apparatus for Compressing Air; and I do hereby declare the following to be a full, clear, and exact description of the invention, such as will enable others skilled in the art to which it appertains to make and use the same.

My invention relates to an apparatus for compressing air, and has for its object great capacity at a very economical cost.

In the accompanying drawings, which form a part of this application, Figure 1 is a plan of my improved apparatus; Fig. 2, a section at the line $x$ $x$ of Fig. 1; Fig. 3, a detail enlarged broken sectional elevation showing particularly the drum and the mounting of the engines therein. Fig. 4 is an enlarged detail sectional elevation showing a pair of cylinders and the manner in which the pistons therein are depressed. Fig. 5 is an enlarged detail sectional elevation showing the relative position of the cylinders on opposite sides of the track. Fig. 6 is an enlarged sectional elevation of one of the valves carried by the piston-head, and Fig. 7 an enlarged detail sectional elevation of one of the auxiliary valves carried by the main valves at the bottoms of the cylinders.

Similar numerals and letters of reference denote like parts in the several figures of the drawings.

1 is any suitable bed of masonry, 2 a circular iron plate secured upon the outer portion of this bed, and 3 a circular T-rail track secured in any suitable manner upon said plate, on top of which rail is a steel tread 4.

5 are brackets which are bolted to the inside of said rail at regular distances apart throughout the circuit of the latter, and 6 are similar brackets bolted to the outside of said rail and also separated by uniform distances. To each of the brackets 5 are bolted a pair of cylinders 7, while to each of the brackets 6 are bolted a pair of cylinders 8.

9 9ª are boxes bolted to the bottoms of the cylinders 7 8, and from these boxes pipes $a$ $b$ lead to pipes 10 11, which latter extend into the reservoir 12, supported on the bed 1. This reservoir is air-tight and is the receptacle for the storage of the compressed air. Any suitable means may be employed for taking the air from this reservoir; but this forms no part of my present invention and I have therefore not shown any means of this sort. Within the cylinders 7 are piston-heads 13, which are provided with ordinary resiliently-acting valves 14, which normally close ports 15, which latter extend through the piston-heads from top to bottom. Immediately below the horizontal plane of the bottom of the piston-heads in their elevated position are inlets 16, which establish communication between the interior of the cylinders and the outside air. The bottoms of the cylinders 7 are closed by plates 17, from which latter depend posts 18, which pass through and are supported within sockets 19 in webs 20, integral with the boxes 9. Around the posts 18 and confined between the bottoms of the plates and the sockets are coil-springs 21, which are very powerful and act to keep the plates with great pressure firmly against the bottoms of the cylinders to close the latter.

Openings 22 are formed in the bottoms of these plates and clear through the same, which openings are normally closed by spring-actuated valves 23. When the pistons descend and pass beyond the inlets 16, the air in the cylinders will be compressed, thereby opening the valves 23, whereupon the air will be driven into the boxes 9 and thence into the reservoir 12. If the stroke of the piston-heads should be quickened for any cause, so that the valves 23 would be taxed beyond their capacity, the plates 17 will yield, thereby affording a sufficient outlet for the air into the boxes 9.

The cover-plates 24 of the cylinders are provided with vents 25, so that there can be no vacuums formed behind the piston-heads while the latter are depressed, while when the piston-heads are elevated from their depressed position a vacuum cannot form below said heads, owing to the fact that the valves 14 will be opened by atmospheric pressure above the piston-heads.

26 are piston-rods to which said piston-heads are secured, the upper ends of said rods being provided with enlarged heads 27, which are guided within the brackets 5 and projected, when in elevated position, inside of the rail 3 and in close proximity thereto.

28 are rocker-bars pivoted at 29 to the brackets 5 and provided at their extremities with forks 30, which embrace the piston-rods loosely immediately beneath the heads 27. These rocker-bars are pivoted at or about their centers, and there is one of these bars for every pair of cylinders, so that it will be readily understood that when one piston-rod of a couplet is depressed the other rod will be elevated, thus causing the piston-heads to act alternately in forcing the air into the reservoir 12.

I have heretofore described the cylinders and the parts operated in connection therewith inside of the track 3, and it is not deemed necessary to enter into any similar description of the cylinders 8 and the parts operated in connection therewith outside of said track, for the reason that these last-named cylinders, as well as the parts operated in connection therewith, are precisely the same in all respects as the cylinders and parts which I have above described. I will therefore merely state that the piston-rods 31, whose reciprocations effect the operation of the parts within the cylinders 8, are provided at their upper ends with enlarged heads 32, which are guided within the brackets 6 and which are projected, when in elevated position, outside of the rail 3 and in close proximity thereto. Rocker-bars 33, pivoted to the brackets 6, are provided with forks at their outer extremities, which embrace the rods 31 immediately beneath the heads 32 in the same manner and for the same purpose as heretofore explained with reference to bars 28.

The relative positions of the heads 27 and 32 are such that they alternate one in advance of the other along the line of the circular track, so that a roller or similar device traveling along said track would depress said heads in succession.

Upon the top of the bed 1, at or about the central portion thereof, is a metallic cap 34, on which is supported a ring 35, having in its upper face an annular recess 36, containing balls 37, and 38 is a cover-ring which rests upon said balls.

Extending upwardly through the cap 34 and rings 35 38 is a steam-pipe 39, the bottom whereof has a swivel connection with a supply-pipe 40, which latter leads from any suitable boiler.

41 is a platform having depending therefrom a hub 42, which latter rests immediately upon a cover-ring 38.

The hub 42 and pipe 39 are tightly secured together, while said pipe extends freely through the ring 35 and cover 38, so that it will be readily understood that the pipe and platform will revolve together, while said cover and ring with the balls interposed merely afford an antifriction-bearing for the hub 42. The pipe 39 extends upward and has secured thereto a collar 43, which latter rests upon an ordinary ball-bearing composed of a ring 44, having therein an annular recess 45, containing balls 46, said ring resting upon a cross-piece 47, which is supported by beams 48 and brackets. (Only one shown.) These bearings for the steam-pipe at the upper and lower extremities thereof are of course very ordinary and I can of course employ any of the usual well-known forms of bearings in this connection, although I prefer to use the ball-bearings.

Mounted upon the platform 41 are the double engines 49, which are supplied with steam from the main pipe 39 by means of small connections 50, the exhaust being conducted through pipes 51. There is a partition (indicated only externally) which extends across the steam-pipe 39 at a point above the connections 50, and I prefer to lead the exhaust-pipes 51 into the steam-pipe 39 above said partition, as shown at Fig. 3; but of course this is an immaterial feature and has nothing to do with my invention.

Loose around the pipe 39 is a collar 52, which is supported by means of adjustable legs 53 upon the platform 41, and also loose around said pipe and resting upon said collar is a bevel-face gear 54, with which mesh bevel-pinions 55 on the inner ends of the driving-shafts 56 of the engines.

The engines are upon opposite sides of the pipe 39, and the pinions 55 will therefore be diametrically opposite each other, the object of this construction being to render one engine one-half a stroke in advance of the other, for the obvious purpose of getting the work out of the engines under the best possible conditions. By means of the adjustable legs 53 the gear 54 may be arranged to insure a better engagement with the pinions 55 in compensation for wear, or said gear may be dropped out of engagement with said pinions entirely.

The engines and the gearing I prefer to cover by means of a drum 57, through the upper portion whereof the pipe 39 loosely extends, the bottom of said drum resting upon the platform 41.

Secured to the platform 41 and extending radially therefrom are bars 58, to which, near their outer extremities, are secured cross-pieces 59 60, which bars and cross-pieces constitute a frame capable of being revolved in harmony with said platform. Journaled between said cross-pieces in any suitable and ordinary manner are rollers 61, which rest at their central portions upon the track 3, said rollers being provided on either side with laterally-extending hubs 62 63, which hubs project, respectively, inside and outside of the track. The diameter of these hubs is only slightly less than that of the rollers at the point where they bear upon the track, so that it will be readily understood that when said rollers travel along the track the hubs will strike against the enlarged heads of the piston-rods on opposite sides of the track and will depress them. The weight of these rollers is considerable and is sufficient to readily depress the piston-rods at all times. On the driving-shafts of the engines are the usual balance-wheels 64, and said shafts extend outwardly and are supported within suitable journals in the frame and have secured thereon near their outer extremities small pinions 65, which latter mesh with large gears 66, rigid on the shafts of the two diametrically-opposite rollers 61.

When rotary motion is communicated to the large gears 66 from the driving-shafts of the engines, the rollers will be revolved and will travel around the track 3 and will during their circuit successively depress the various piston-rods. In the construction shown in the drawings there are one hundred and twenty-eight of these piston-rods, while there are sixteen of the traveling rollers, so that it will be evident in a single complete revolution of the frame there will be sixteen times one hundred and twenty-eight or two thousand and forty-eight downward impulses of piston-rods, and this gives a very great capacity to the apparatus.

Owing to the size of the gears used to communicate motion from the driving-shafts to the frame, the full benefit of the power from the engines is obtained, while at the same time, if the latter are speeded even moderately fast, so as to cause the frame to revolve not over ten times a minute, over twenty thousand piston impulses will be effected, and this is in excess of the capacity of any apparatus in use at the present time for compressing air.

If desired, but one series of cylinders need be employed, since the dispensing with either the inner or outer series merely decreases the capacity of the apparatus.

Having thus described my invention, what I claim as new, and desire to secure by Letters Patent, is—

1. In an apparatus for compressing air, the combination of the bed which supports an air tight reservoir and a circular track, a series of rollers on said track, means for propelling said rollers, a series of cylinders whose lower extremities are in communication with said reservoir and which have communication with the external atmosphere, piston rods carrying heads adapted to operate within said cylinders and provided at their upper extremities with enlargements which latter normally project upward in close proximity to said track and within the field of travel of said rollers, and the pivotally supported rocker bars having their extremities at either end extended beneath said enlargements whereby the piston rods are coupled together in pairs and the depression of one rod of a pair will effect the elevation of the other rod, substantially as set forth.

2. In an apparatus for compressing air, the combination of the bed which supports a circular track, an air tight reservoir and a rotary platform, the frame extending radially from said platform and having journaled therein rollers which rest upon said track, engines mounted upon said platform, operative connections between the driving shafts of said engines and said rollers whereby the latter will be caused to travel around said track, a series of cylinders which are connected respectively with said reservoir and the external atmosphere, a series of piston rods which carry piston heads adapted to operate within said cylinders and which have upon their upper extremities enlargements which normally project close to said track and within the field of travel of said rollers, and the pivotally supported rocker bars whose extremities at each end extend beneath the enlargements at the upper ends of adjacent piston rods whereby the latter are connected together in couplets, substantially as set forth.

3. The combination of the bed which supports an outer circular track, an air tight reservoir and a rotary platform, the frame extending radially from said platform and having journaled therein rollers which rest upon said track and are provided with laterally extending hubs, engines mounted upon said platform, operative connections between the driving shafts of said engines and said rollers whereby the latter will be caused to travel around said track, cylinders arranged in pairs each pair having connection with said reservoir and with the external atmosphere, a pair of piston rods carrying piston heads which operate within said cylinders, said rods having at their upper extremities enlarged heads which in their normally elevated position are close to said track and within the field of travel of said rollers, the pivotally supported rocker bars whose extremities at each end embrace said rods immediately below said cylinders, whereby the depression of one of the heads of such pair will effect the elevation of the other head, substantially as set forth.

4. In an organized machine for compressing air, the circular track, and the roller traveling thereon and overlapping the sides thereof, the series of cylinders arranged in pairs alternately inside and outside the track and having pistons in proximity to the track, the pistons of each pair connected by a pivoted lever so that one is raised as the other is depressed, the cylinder of an outside pair being opposite the interval between the cylinders of an inside pair and vice versa, all combined substantially as described 5. In an organized machine for compressing air, the circular track and the roller traveling thereon, the air compressing cylinders in proximity to said track, each cylinder having a piston in position to be operated by the traveling roller and having connection to a storage reservoir, and the centrally pivoted engine having a central steam supply and having connection to the roller running on the circular track, all combined substantially as described.

6. In an organized machine for compressing air, the circular track and air compressing cylinders in proximity thereto, the roller moving on said track, the pistons and connections in the path of movement of said roller, the centrally pivoted engine having a central steam supply pipe, and a shaft extending from said engine and having geared engagement with the traveling roller, all combined and arranged substantially as described.

7. In a machine for compressing air, the circular track and rollers traveling thereon, the air compressing cylinders having pistons in position to be operated by said rollers, the centrally pivoted engine having a frame in which the rollers have their bearings and having a central steam supply, and geared connections from the engine to the rollers whereby the rollers are driven and the engine carried round its center, all combined substantially as described.

In testimony whereof I affix my signature in presence of two witnesses.

EPHRAIEM CHAQUETTE.

Witnesses:
F. W. SMITH, Jr.,
M. T. LONGDEN.